United States Patent [19]

Scott et al.

[11] 4,349,361

[45] Sep. 14, 1982

[54] VACUUM CLEANER BAG HANGER ASSEMBLY

[75] Inventors: Ernest R. Scott, Mayfield Heights; William D. Bowers, Avon, both of Ohio

[73] Assignee: The Scott & Fetzer Company, Lakewood, Ohio

[21] Appl. No.: 308,576

[22] Filed: Oct. 5, 1981

[51] Int. Cl.³ ............................................. B01D 46/02
[52] U.S. Cl. ..................................... 55/357; 15/351; 55/374; 55/378; 55/508; 55/DIG. 3; 248/221.3; 248/225.2
[58] Field of Search ................. 55/357, 374, 378, 472, 55/473, 508, DIG. 3; 15/351, 350; 248/215, 221.3, 222.1, 225.2

[56] References Cited

U.S. PATENT DOCUMENTS

| | | | |
|---|---|---|---|
| 1,444,165 | 2/1923 | Clements | 55/378 |
| 1,900,271 | 3/1933 | Ballou | 15/351 X |
| 2,259,855 | 10/1941 | Martinet | 55/378 X |
| 3,031,710 | 5/1962 | Huening, Jr. | 15/350 X |
| 3,150,405 | 9/1964 | Tissler | 15/351 |
| 3,683,599 | 8/1972 | Malz | 55/378 X |

Primary Examiner—Kathleen J. Prunner
Attorney, Agent, or Firm—Pearne, Gordon, Sessions, McCoy & Granger

[57] ABSTRACT

There is disclosed a quick-connect-disconnect coupling for attaching a flexible dirt-receiving bag to the handle of an upright vacuum cleaner. The coupling includes first and second coupling members, respectively, which are rigidly attached to the handle and to the bag, with the second member rigidly supporting at least a major portion of a bag-supporting casing as a cantilever. The first coupling member defines a pocket in which there is provided a fixed member and a movable member. The movable member is biased toward the fixed member, and the second coupling member is adapted to be releasably inserted between the fixed and movable members. The movable and fixed members cooperate with the second coupling member to define a one-way ratchet which is releasable upon movement of the movable member away from the fixed member.

10 Claims, 6 Drawing Figures

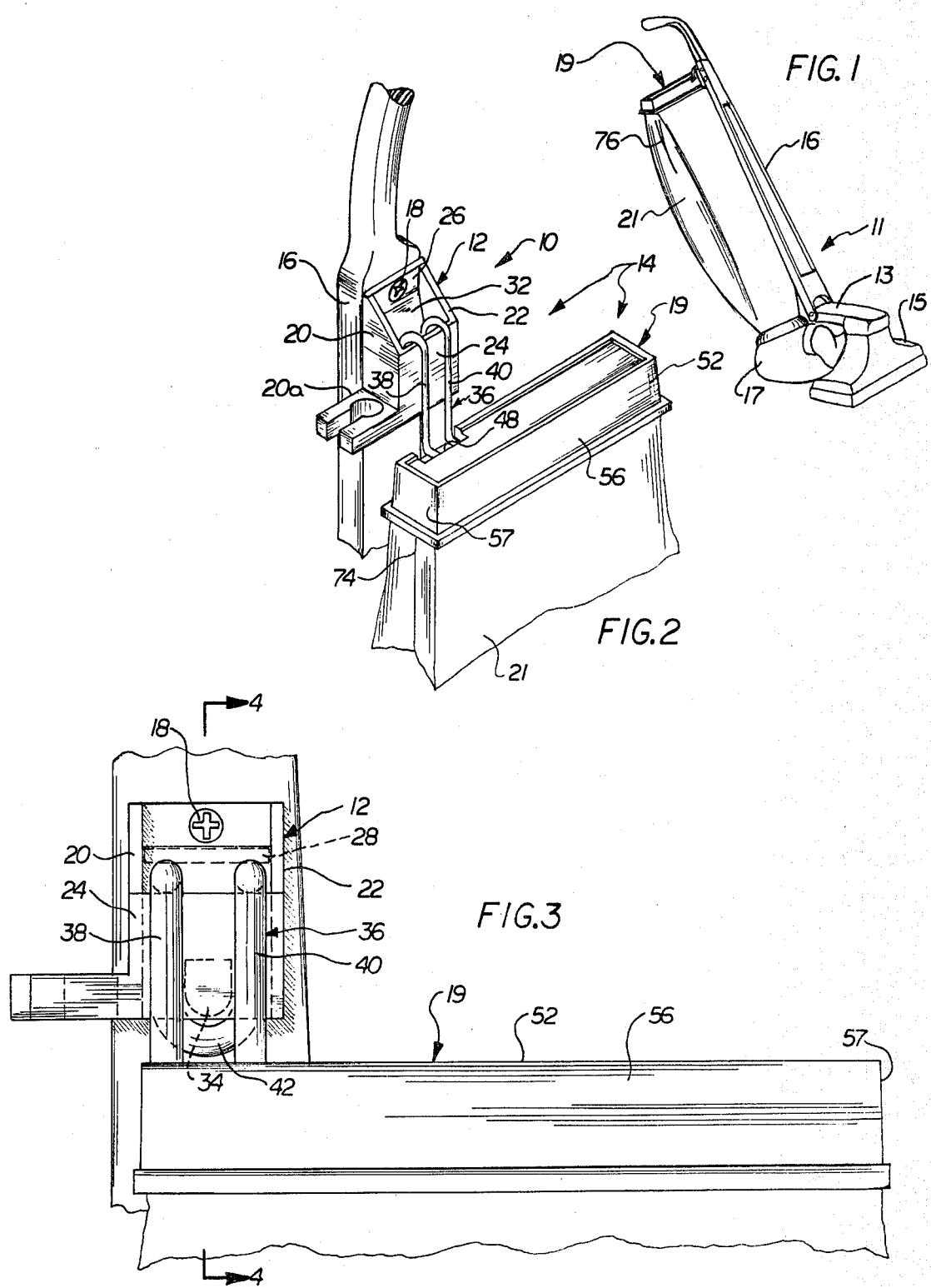

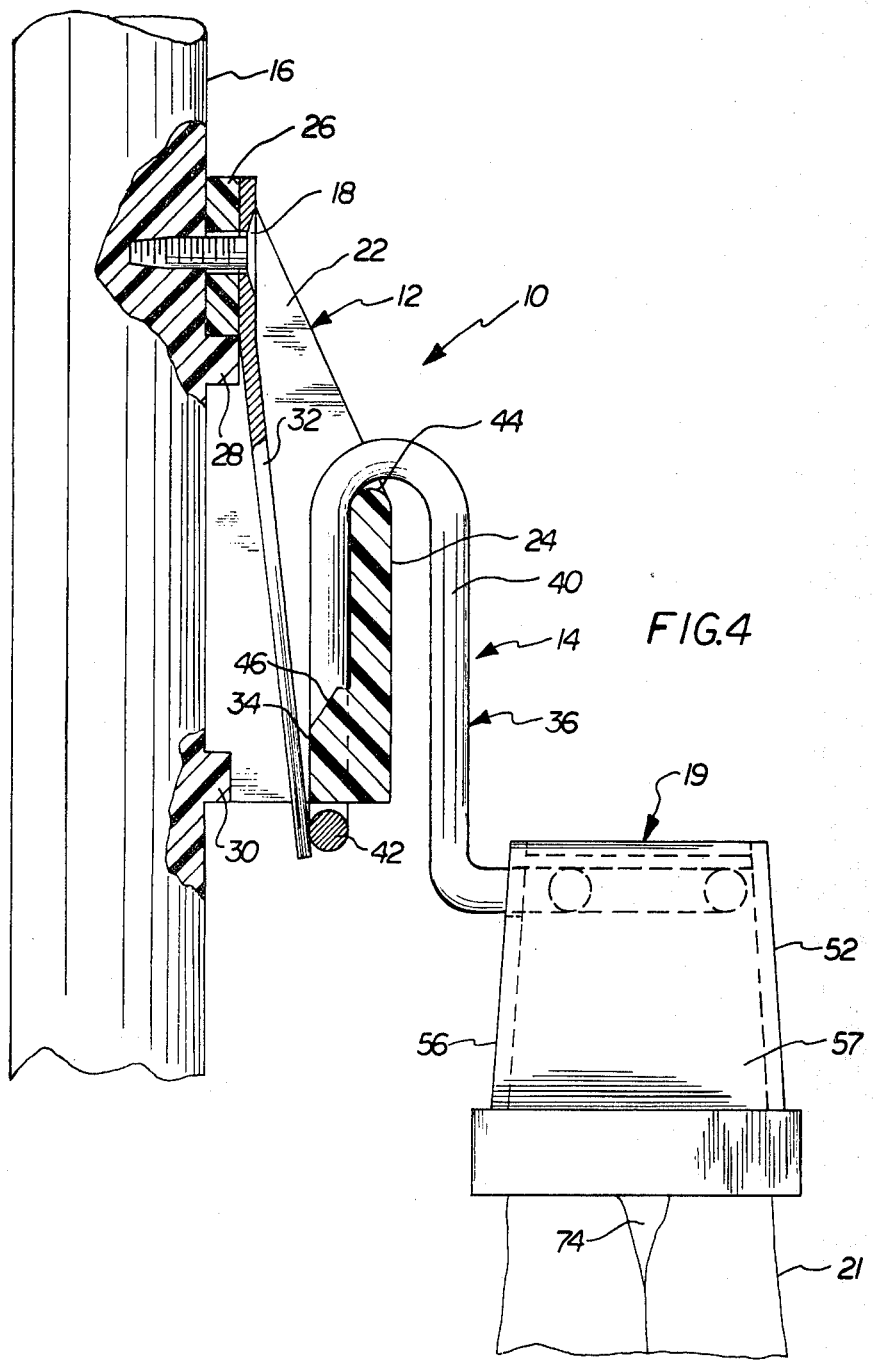

VACUUM CLEANER BAG HANGER ASSEMBLY

BACKGROUND OF THE INVENTION

This invention relates to vacuum cleaners and, more particularly, to upright vacuum cleaners of the type having a wheeled motor housing adapted to mount an on-the-floor or off-the-floor cleaning attachment. Such a vacuum cleaner has a handle pivotally connected to the housing for ease of operation during on-the-floor cleaning operations and has a flexible dirt-collecting bag extending from an exhaust fan outlet to a connection at the upper portion of the handle.

Early vacuum cleaners of this type include a dirt bag which is more or less symmetrically located with respect to the vertical axis of the cleaner and which relies merely upon retention of the dirt to the walls of the bag. To clean such a bag, the lower portion of the bag is removed from its connection to the motor housing and the contents of the bag are dumped on or into a collecting means such as a newspaper or paper bag. Later vacuum cleaner models such as shown in U.S. Pat. No. 4,262,384 and U.S. Pat. No. Des. D222,593 provide for a dirt-collecting box mounted on one side of the motor housing with an exhaust outlet asymmetrically located with respect to the axis of the cleaner to facilitate dirt discharge and removal from the cleaner.

In each such arrangement, the bag extends from the exhaust outlet to an upper portion of the handle and is connected to the upper portion of the handle by a ring on the bag which cooperates with a spring clasp or snap hook attached to the handle. Generally speaking, the spring clasp or snap hook is attached to a wire which is similar to a wire coat hanger having inwardly turned ends which support the top of the dirt-collecting bag. In some instances, the wire and a portion of the top of the bag are covered with an enveloping plastic or metal sleeve which fits over the top of the bag and compresses the top of the bag into a flat, rectangular, seamed configuration.

With such arrangements, the flexible bag tends to be flexed from a normal upright position, which detracts from the appearance of the cleaner. More importantly, however, a flexed bag may not provide optimum dirt-filtering capacity for an external dirt-collecting bag, or may distort an internally contained disposable bag, with similar results.

SUMMARY OF THE INVENTION

This invention provides a bag-mounting arrangement for a vacuum cleaner that results in a tailored bag appearance and which minimizes folds or wrinkles in the inner paper and outer cloth bags which would tend to reduce the filtering capacities of both bags.

According to this invention, an improved coupling is provided between the handle and the top of the bag. The coupling is a quick-disconnect type which may be easily removed and attached. The coupling includes first and second coupling members, respectively, which are rigidly attached to the handle and the bag. The first coupling member includes a pocket defined by sidewalls and a front connecting web located on the handle. Within the pocket there is provided a leaf spring which is attached to the handle and which is normally biased against the front web. The front web includes a horizontal projection against which the leaf spring is biased. The flexible dirt-receiving bag is supported at its top by a rigid top bar or casing and the second coupling member rigidly supports at least a major portion of the top bar as a cantilever. The second coupling member comprises a hook-shaped wire extending outwardly and upwardly from the bar and then downwardly into the pocket. The single wire is formed into a pair of parallel legs joined by a U-shaped portion at their pocket-received portion. By inserting the downwardly extending U-shaped portion of the second coupling member into the pocket and between the leaf spring and the horizontal projection of the web, the downwardly extending portion snaps between the leaf spring and the horizontal projecting portion so that its U-shaped portion is captured between the leaf spring and the bottom portion of the horizontal projection. The sidewalls of the pocket are closely spaced from the legs of the wire to prevent any skewing of the second coupling member, and therefore the top bar of the bag.

BRIEF DESCRIPTION OF THE DRAWINGS

FIG. 1 is a perspective view of a vacuum cleaner having an improved bag coupling according to this invention;

FIG. 2 is a fragmentary, perspective view of the handle of the vacuum cleaner, having a flexible dirt-receiving bag in coupled relationship thereto;

FIG. 3 is a fragmentary, elevational view of a vacuum cleaner handle and a vacuum cleaner bag, showing the coupled connection between those members;

FIG. 4 is a side elevational view, partly in section, illustrating the coupled connection between a vacuum cleaner handle and a vacuum cleaner bag;

DETAILED DESCRIPTION OF THE DRAWINGS

Figure 5:
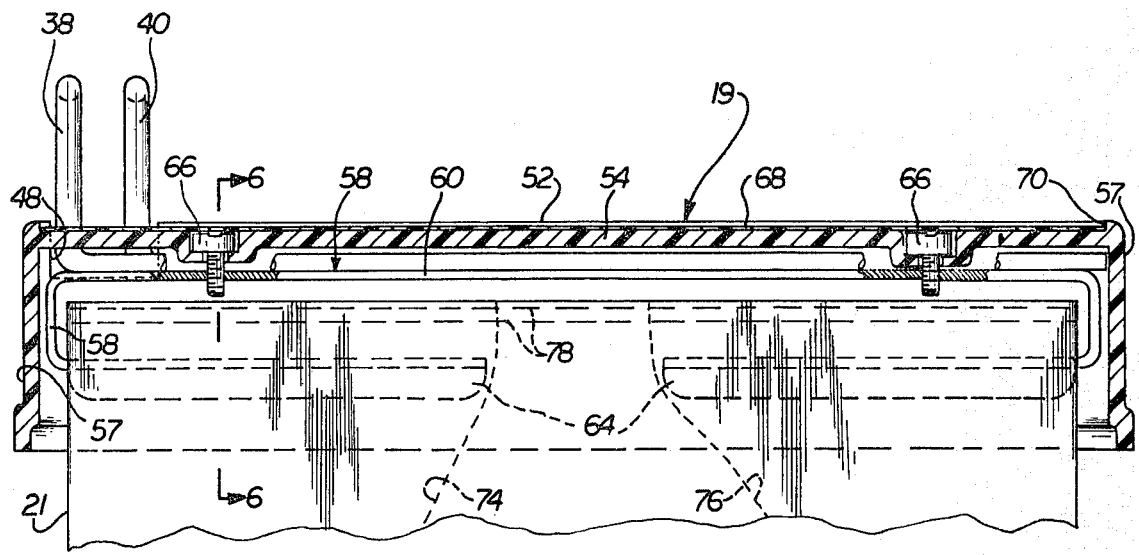
FIG. 5 is a fragmentary, elevational view, partly in section, illustrating the support arrangement between the top casing and the vacuum cleaner bag.

There is illustrated in FIG. 1 a vacuum cleaner 11 which includes a handle 16 pivoted to a motor housing 13. The vacuum cleaner 11 further includes a rug-engaging nozzle 15, a dirt-collecting box 17, a bag-mounting assembly 19, and a flexible dirt-receiving bag 21.

The vacuum cleaner 11 has a quick-connect-disconnect coupling 10 (FIG. 2) between a first coupling member 12 and a second coupling member 14. The first coupling member 12 is fixed to the handle 16 of the upright vacuum cleaner 11 by a screw 18.

The first coupling member 12 includes a pocket which is defined by parallel sidewalls 20 and 22, which are joined by a connecting web 24. A cord holder 20a projects from the sidewall 20. The pocket is open at the top and bottom, and a top web 26 further connects the sidewalls 20 and 22. In order to restrain the pocket from rotation about the screw 18, the handle is provided with an upper projection 28 against which the web 26 rests and lower projections 30 which extend between the sidewalls 20 and 22. The screw 18 passes through the web 26 and through a leaf spring 32 which is normally biased against a horizontal projection 34 of the web 24.

The second coupling member 14 includes a hook-shaped wire 36 which is received within the pocket of the first coupling member 12. The wire 36 extends upwardly from the bag-mounting assembly 19, and then downwardly into the pocket of the first coupling member 12. The single wire 36 has a pair of parallel legs 38 and 40 having a U-shaped portion 42 which enters the pocket of the first coupling member 12. The second coupling member 14 is attached to the first coupling member 12 by hooking the wire 36 over a lip 44 (FIG. 4) of the web 24. The U-shaped portion 42 is guided downwardly against the bias of the spring 32 by a beveled portion 46 of the horizontal projection 34 until the U-shaped portion 42 is retained beneath the projection 34 by the spring 32, as illustrated in FIG. 3. To release the second coupling member 14 from the first coupling member 12, the bag is pushed toward the handle 16 to rock the wire 36 about the lip 44 so that the hook-shaped portion 42 forces the leaf spring 32 toward the handle to permit the second coupling member 14 to be lifted upwardly out of the pocket.

As may be noted, the wire 36 is securely retained in the pocket and is held against twisting movement by the horizontal projection 34, since, as may be seen in FIG. 3, that projection has a width which is only slightly less than the spacing between the legs 38 and 40. Furthermore, the sidewalls 20 and 22 are spaced apart a distance which is slightly greater than the width of the hook-shaped wire received within the pocket.

Figure 6:
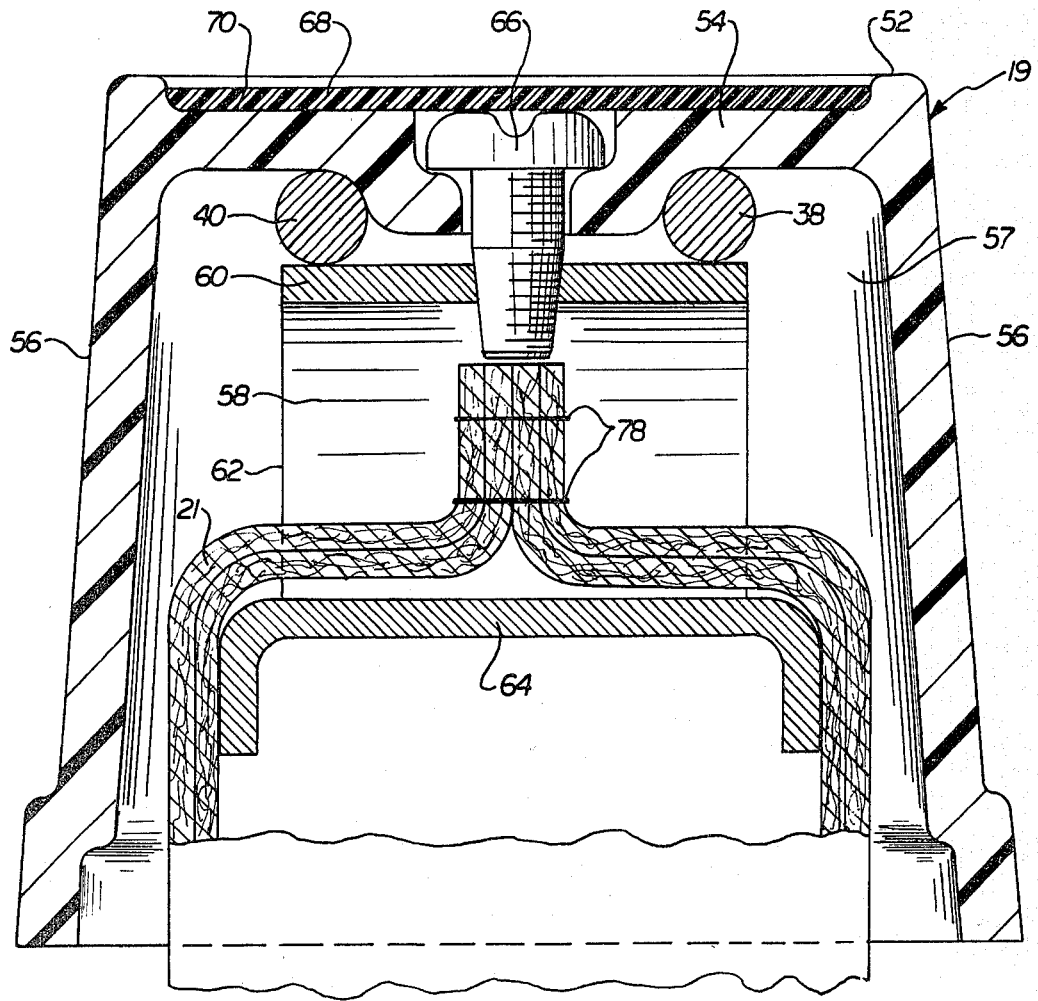
FIG. 6 is a cross-sectional view, the plane of the section being indicated by the line 6—6 in FIG. 5.

Referring now to FIGS. 5 and 6, the wire legs 38 and 40 project through an aperture 48 provided in a rigid top bar casing 52 of the bag-mounting assembly 19. The top bar casing 52 is preferably made from plastic and comprises an inverted, rectangular cup having a top wall 54 and depending side and end walls 56 and 57, respectively. As may be noted in FIG. 2, the legs 38 and 40 enter the aperture 48 in a plane which is substantially parallel to the longitudinal axis of the casing 52. As is indicated in FIGS. 2 and 5, the leg 38 is bent toward a sidewall 56, and then extends toward the opposite end wall 57. The leg 40 extends to the proximity of the sidewall 56 and is bent to extend directly toward the opposite end wall 57 and is parallel to the leg 38 within the casing 52.

A bag hanger bracket 58 is provided within the casing 52 and includes a top web 60, depending legs 62, and inwardly turned bag support arms 64. The top web 60 is attached to the underside of the top wall 54 by screws 66 so that the web 60 clamps the legs 38 and 40 firmly against the underside of the top wall 54. In order to conceal the screws 66, a pressure-sensitive adhesive laminate 68 may be provided in a recessed portion 70 of the top wall 54. If desired, aesthetics, model identification or other indicia may be provided on the surface of the laminate 68.

The flexible dirt-receiving bag 21 is suspended from the hanger bracket 58. The bag 21 is preferably constructed from a tightly woven, conventional filter cloth material and is provided with side pleats 74 and 76 which are tucked in, and the top of the bag is sewn together along seams 78.

Thus, side pockets are formed in the bag 21 and the bag is mounted so that the arms 64 enter each side pleat. It may be noted in FIG. 6 that the arms 64 are relatively wide so that the bag 21 tends to fill the cup-shaped top casing 52 to afford a tailored appearance to the bag so that the bag appears to be an extension of the cup-shaped top casing as to its length and width dimensions.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. In an upright vacuum cleaner having a motor housing, a handle pivotally connected to said housing, and flexible dirt-receiving bag means extending between said housing and said handle, said bag means having rigid top casing means supporting said bag means, in combination therewith the improvement comprising a quick-connect-disconnect coupling between said handle and said housing, means to connect said bag means to said coupling and means to connect said bag means to said housing, said coupling including first and second coupling members, respectively, which are rigidly attached to said handle and said top casing means, respectively, with said second member rigidly supporting at least a major portion of said casing means as a cantilever, said first coupling member having means defining a pocket, said pocket-defining means including a fixed member and a member movable with respect to said fixed member, said movable member being biased toward said fixed member, said second member being releasably inserted between said fixed and movable members, means on said movable and fixed members cooperating with said second member to define a one-way ratchet which is releasable upon movement of said movable member away from said fixed member.

2. The improvement according to claim 1, wherein said second member rigidly supports substantially all of said casing means as a cantilever.

3. The improvement according to claim 1, wherein said means on said movable member defining said one-way ratchet is a leaf spring.

4. The improvement according to claim 1, wherein said second coupling member comprises a hook-shaped wire extending outwardly and upwardly from said casing means and then downwardly into said pocket.

5. The improvement according to claim 4, wherein the pocket entering end of said wire has a horizontally extending portion, wherein said means on said fixed member of said pocket defining said one-way ratchet includes a horizontal projection, and wherein the horizontally extending portion of said wire is captured beneath the horizontal projection of said fixed member by said movable member.

6. The improvement according to claim 5, wherein said hook-shaped wire comprises a wire form having a pair of spaced parallel legs and wherein said horizontally extending portion of said wire comprises a U-shaped portion joining said legs.

7. The improvement according to claim 6, wherein the horizontal projection of said fixed member has a width slightly smaller than the distance between said legs so that said second coupling member is restrained from rotative movement with respect to said first coupling member.

8. In an upright vacuum cleaner having a motor housing, a handle pivotally connected to said housing, and a flexible dirt-receiving bag extending between said housing and said handle, said bag having rigid top casing means supporting said bag, in combination therewith the improvement comprising a quick-connect-disconnect coupling between said handle and said housing, said coupling including first and second coupling members, respectively, which are rigidly attached to said handle and said top casing means, respectively, with said second member rigidly supporting at least a major portion of said casing means as a cantilever, said first coupling member having means defining a pocket, said pocket having spaced sidewalls, a connecting front web, and an open top, said connecting web having a horizontal porjection, a leaf spring within said pocket and being biased toward said horizontal projection, said second coupling member comprising a hook-shaped wire extending upwardly from said casing means and then downwardly into said pocket, said hook-shaped wire comprising a wire having a pair of parallel legs joined at their pocket-received portion by a U-shaped portion, said horizontal projection of said web projecting between said parallel legs and having a width slightly less than the spacing between said legs, so that said second coupling member is restrained from rotative movement with respect to said first coupling member.

9. The improvement according to claim 8, wherein said spaced sidewalls are spaced apart a distance which closely corresponds to the width of the downwardly extending portion of said wire to further restrain rotative movement of said second coupling member.

10. The improvement according to claim 9, wherein the vertical extent of said web substantially corresponds to the vertical extent of said downwardly extending portion of said wire.

* * * * *